(12) United States Patent
Lanza et al.

(10) Patent No.: US 10,147,215 B2
(45) Date of Patent: Dec. 4, 2018

(54) DIGITALLY GENERATED SET OF REGIONAL SHAPES FOR PRESENTING INFORMATION ON A DISPLAY SCREEN

(71) Applicant: Streetography, Inc., Menlo Park, CA (US)

(72) Inventors: Michael Lanza, Menlo Park, CA (US); Konstantin Varik, Moskovskaya obl. (RU)

(73) Assignee: Streetography, Inc., Menlo Park, CA (US)

( * ) Notice: Subject to any disclaimer, the term of this patent is extended or adjusted under 35 U.S.C. 154(b) by 0 days.

(21) Appl. No.: 15/131,013

(22) Filed: Apr. 17, 2016

(65) Prior Publication Data

US 2017/0301118 A1     Oct. 19, 2017

(51) Int. Cl.
| | |
|---|---|
| *G06T 11/60* | (2006.01) |
| *G06T 11/20* | (2006.01) |
| *G06F 3/0484* | (2013.01) |
| *G06T 1/20* | (2006.01) |

(52) U.S. Cl.
CPC .......... *G06T 11/60* (2013.01); *G06F 3/04845* (2013.01); *G06T 1/20* (2013.01); *G06T 11/203* (2013.01); *G06F 2203/04806* (2013.01)

(58) Field of Classification Search
CPC ........... G06F 17/30241; G06F 3/04845; G06F 2203/04806; G06T 11/60; G06T 1/20; G06T 11/203
See application file for complete search history.

(56) References Cited

U.S. PATENT DOCUMENTS

| | | | |
|---|---|---|---|
| 6,622,085 B1* | 9/2003 | Amita | G01C 21/32 340/990 |
| 2011/0267369 A1 | 11/2011 | Olsen | |
| 2012/0154418 A1 | 6/2012 | Mikawa | |
| 2012/0162252 A1 | 6/2012 | Endo | |
| 2012/0306922 A1 | 12/2012 | Kadous | |
| 2013/0150124 A1* | 6/2013 | Kim | H04W 64/00 455/556.1 |
| 2013/0268881 A1 | 10/2013 | Bartkiewicz | |
| 2013/0332068 A1 | 12/2013 | Kesar | |

(Continued)

FOREIGN PATENT DOCUMENTS

WO     2017/184196 A1     10/2017

OTHER PUBLICATIONS

U.S. Appl. No. 15/131,010, filed Apr. 17, 2016, for: A Digitally-Generated Map Containing Defined Regions for Rendering with Photo Overlays.

(Continued)

*Primary Examiner* — Maurice L. McDowell, Jr.
(74) *Attorney, Agent, or Firm* — SF Bay Area Patents, LLC; Andrew V. Smith

(57) ABSTRACT

Regional shapes are generated that respectively enclose geographic regions determined within a map area on the display screen. A pattern of vertices is generated within the map area as a set of intersections of map features. Regional shapes are formed by connecting subsets of vertices to form closed shapes. Data sets corresponding to the regional shapes are transmitted to a processor based device that is programmed to render the map area on a display screen with photo overlays that match the regional shapes.

45 Claims, 9 Drawing Sheets

(56) References Cited

U.S. PATENT DOCUMENTS

| 2014/0267279 | A1 | 9/2014 | Kontkanen |
| 2015/0046194 | A1 | 2/2015 | Waddell et al. |
| 2015/0369623 | A1 | 12/2015 | Blumenberg et al. |
| 2016/0071496 | A1* | 3/2016 | Jones ............... G06T 3/0075 345/636 |
| 2017/0069123 | A1 | 3/2017 | Hochmuth |
| 2017/0301117 | A1 | 10/2017 | Lanza |

OTHER PUBLICATIONS

PCT Application No. PCT/US16/55397, filed Apr. 17, 2016, for: A Digitally Generated Set of Regional Shapes for Presenting Information on a Display Screen.

PCT Notification of Transmittal of the International Search Report and the Written Opinion of the International Searching Authority, or the Declaration, for PCT Application No. PCT/US16/55397, dated Jan. 31, 2017, 10 Pages.

Non-Final Rejection, dated Mar. 31, 2017, for U.S. Appl. No. 15/131,010, filed Apr. 17, 2016.

Final Rejection, dated Sep. 11, 2017, for U.S. Appl. No. 15/131,010, filed Apr. 17, 2016.

123RF Stock Photos. (2017). The world map with all states and their flags. [online] Available at: https://www.123rf.com/photo_9143354_the-world-map-with-all-states-and-their-flags.html [Accessed Aug. 8, 2017] [Archived Mar. 20, 2015].

Notice of Allowance, dated Aug. 24, 2018, for U.S. Appl. No. 15/131,010, filed Apr. 17, 2016.

Corrected Notice of Allowability, dated Sep. 13, 2018, for U.S. Appl. No. 15/131,010, filed Apr. 17, 2016.

* cited by examiner

DIGITALLY GENERATED SET OF REGIONAL SHAPES FOR PRESENTING INFORMATION ON A DISPLAY SCREEN

RELATED APPLICATION

This application is related to a contemporaneously-filed application by the same Applicant, entitled "A DIGITALLY-GENERATED MAP CONTAINING DEFINED REGIONS FOR RENDERING WITH PHOTO OVERLAYS," application Ser. No. 15/131,010, which is incorporated by reference.

BACKGROUND

Maps generally include geographic features such as rivers, lakes and mountains, as well as man-made architectural structures such as streets and roads, and boundaries defined between regions such as countries and states. Subsets of larger map areas can be provided in accordance with a selected zoom setting as geographic regions that can be displayed on a screen of a processor-based digital device that has a limited area and a limited number of pixels.

FIGS. 1A-1C schematically illustrate three example zoom settings that feature geographic regions that differ in the real area but occupy a similar pixel area on a display screen. FIGS. 1A-1C illustrate screen shots of a same location on a map at three zoom levels referred to in this example as blocks, neighborhoods and cities. For a same geographic location and display screen size, regions of greater zoom are generally included within lower zoom regions, while greater zoom regions typically include more details and features per unit of real area than lower zoom regions. In the example of FIGS. 1A-1C, the regions featured in the screen shot corresponding to the highest of three example zoom settings are the city blocks of FIG. 1A, while regions of lesser zoom may feature the neighborhoods illustrated at FIG. 1B, and regions of still lesser zoom may feature the cities of FIG. 1C.

Geographic regions of various sizes and locations can have subjective, objective or commercial meanings that conventional maps do not convey. It is desired to have a map that is configured to convey meanings associated with geographic regions on a map. As described in accordance with example embodiments below, meanings may be conveyed by associating digital images with geographic map regions.

DETAILED DESCRIPTION OF THE EMBODIMENTS

Figure 1A:
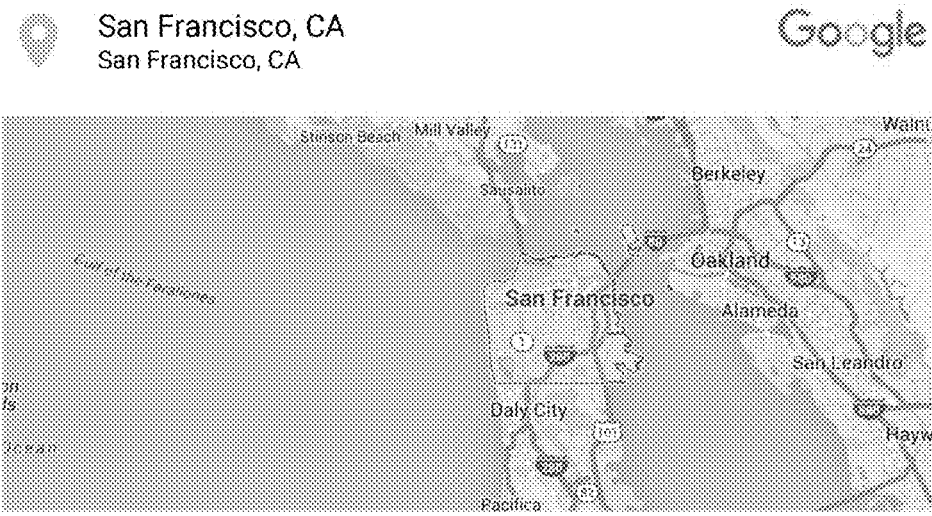
FIGS. 1A-1C schematically illustrate three example geographic regions corresponding to a location on a map at three zoom levels referred to, respectively, as cities, neighborhoods, and blocks in accordance with certain embodiments.

A method is provided herein for generating digital representations that match the shapes of geographic regions appearing within a map area on a display screen. The digital representations may be used to create informational overlays from data associated with the geographic regions for rendering within the map area on the display screen. The method includes selecting a map area that includes one or more geographic regions for rendering by a processor on a display screen. Map data are downloaded corresponding to map features appearing within the map area. A pattern of vertices of intersecting map features is collected from the map data. One or more regional shapes is/are generated that respectively enclose the one or more geographic regions on the display screen based on the pattern of vertices. Data sets corresponding to the one or more regional shapes are transmitted to a processor based device that is programmed to present information associated with the one or more geographic regions to a user by rendering said map area on a display screen with said presented information overlayed within said one or more geographic regions.

The method may include rendering the map area on a display screen including photo overlays and/or other presentations of subsets of the associated information matching respective geographic regions.

One or more regional shapes may be formed by connecting one or more subsets of vertices to form one or more continuous boundaries for one or more geographic regions. The continuous boundaries may include polygons including pairs of adjacent sides that intersect at a vertice within the collected pattern of vertices.

Intersecting map features may include boundaries of real areas represented by one or more geographic regions configured for rendering on the display screen. Intersecting map features may include streets, water, parks, neighborhoods, or legislative or jurisdictional borders, or combinations thereof.

Digital image data associated with one or more geographic regions may be retrieved and shaped by a processor to match one or more geographic regions. In certain embodiments, a digital image is cut out to match the size and shape of a geographic region. Digital image data may include photo overlays and/or pictorial subsets of photographs that are respectively associated with and sized and shaped to match one or more geographic regions.

A map area may be selected based on point location and zoom inputs. The one or more geographic regions and regional shapes may be updated based on received point location updates and/or zoom level changes.

A predetermined number of regional shapes may be defined within the map area for generating matching photo overlays from the digital image data.

Intersecting map features may include one or more segments that intersect other intersecting map features at each end defining two of the vertices within the collection of vertices.

The one or more regional shapes may include polygonal or curved shapes or a combination thereof.

The method may include receiving one or more sets of image data respectively associated with the one or more geographic regions. One or more of the selected photo overlays is/are generated from the sets of image data to respectively match one or more regional shapes for rendering one or more pictorially overlayed geographic regions within the map area on the display screen.

A processor-based device is also provided that includes a processor, a port for sending and receiving data over a network, and one or more digital storage devices having embedded therein code for programming the processor to perform a method of generating geographic regional shapes for creating matching photo overlay subsets from associated image data to render within a map on a display screen in accordance with any of the embodiments or examples described herein or structural or function equivalents thereof.

One or more processor-readable digital storage devices is/are also provided with code embedded therein for programming a processor to perform a method of generating geographic regional shapes for creating matching pictorial overlays from associated image data to render within a map on a display screen in accordance with any of the embodiments or example described herein or structural or function equivalents thereof.

A method of displaying digital images within features on a map is also provided. The method includes receiving data identifying a geographic location and zoom setting. One or more geographic regions is/are selected within a map area to be rendered on a display screen based on the geographic location, the zoom setting and map feature data for the map area. One or more received digital images is/are associated with one or more geographic regions. One or more photo overlay subsets is/are generated from the one or more digital images that respectively match one or more shapes of the one or more geographic regions within the map area to be rendered on the display screen. Rendering the map area on the display screen may include overlaying one or more matching pictorial subsets respectively onto one or more geographic regions within the map area.

The one or more digital images may be selected from one or more digital files. The one or more digital images may be selected based on metadata associated with the one or more digital images or the one or more digital files or both. The one or more digital images may be selected based on metadata associated with a particular map user. The one or more digital images may be selected based on most likes, most views, most comments, most recent image submitted or most recent image captured, or combinations thereof.

The one or more digital images may be selected based on locations, e.g., latitude and longitude or gps location, that are associated with the digital images. For example, these locations may be the locations of the camera when the digital images were captured or the locations of scenes or objects in the captured images, or locations where the digital images were uploaded to the internet or where the photographer lives or works.

Multiple images may overlay a same geographic region. Multiple photo overlay subsets may be associated with a same geographic region. Multiple images may be selected to alternately overlay a same geographic region. Multiple photo overlay subsets may be combined in a collage overlay of a geographic region within the map area on the display screen.

The one or more geographic regions may include a city, a neighborhood or a block. In certain embodiments, the geographic regions do not overlap each other on the map.

A zoom setting may be selected based on tracked user data or manual input from a user or a combination thereof.

A set of multiple digital images may be selected to respectively overlay a set of multiple non-overlapping geographic regions on a map area rendered on a display screen.

Multiple sets of digital images may be associated and shaped to overlay multiple respective geographic regions or multiple types of regions or combinations thereof. Multiple types of geographic regions may correspond to different zoom values and/or different geographic locations. Geographic locations may include locations discerned from gps having latitude and longitude coordinates.

The one or more photo overlay subsets may be sized to respectively match one or more sizes of one or more geographic regions within the map area to be rendered on the display screen.

A processor-based device is also provided including a processor, a port for sending and receiving data over a network, and one or more digital storage devices having embedded therein code for programming the processor to perform a method of displaying digital images within features on a map in accordance with any of the embodiments or examples described herein or structural or function equivalents thereof.

One or more processor-readable digital storage devices is/are also provided that have embedded therein code for programming a processor to perform a method of displaying digital images within features on a map in accordance with any of the embodiments or example described herein or structural or function equivalents thereof.

Examples of Block Polygon or Other Geographic Region Generation and Serving to Client Digital maps may be rendered on any display screen that is part of or coupled to a processor-based device, or digital device, that is programmed to render map images on the screen. The digital device may retrieve map data from a server that is connected on the same network as the digital device. The map data may be continuously accessed over the network connection or certain map data may be downloaded onto the digital device or another device on a local area network that the device is connected within. For example, Open Street Maps data may be downloaded and utilized for rendering map areas that may be centered at or near a certain gps location. In certain embodiments, data derived from Open Street Maps may be used to create image overlays that are placed on top of maps derived from non-Open Street Maps mapping systems such as Google Maps or Apple Maps or other mapping systems, particularly those tending to be consistent for geographies of interest.

The size of the real area that is represented on the display screen map depends on a zoom setting for the map and can range from a several meters to several thousands of kilometers. Zooming in or out may be actuated in accordance with a default method of an underlying digital mapping technology, and/or by pinch zooming such as on a touch screen display screen and/or by actuating a continuous or quasi continuous linear slider that may be configured to zoom in or out by a certain increment in the magnification or reduction multiplier or set of multipliers.

The geographic region type may change at when a certain zoom level is crossed while increasing or decreasing zoom. For example, referring to FIGS. 1A-1C, three geographic region types may be defined such as cities, neighborhoods and blocks or countries, states and cities or galaxies, star clusters and solar systems. Other examples of geographic region types that may depend on zoom level include counties, states, provinces, regions, countries, or continents, or if the map is of a theme park, then certain roller coasters may be regions or food, rides, games, water park and zoo may be five geographic regions that may appear on a map area on a display, or a shopping mall may have stores or groups of stores as regions, or a seating chart may have certain price levels for tickets as regions and pictorial subsets of persons within each region may overlay the region on the map area on the display screen and/or may have a same size and/or shape as the region, or a company regional management map may include geographic regions where the company does business each headed by a manager whose face appear as a pictorial overlay on the geographic region, or a game device map of quests or levels, or anything else about which one may benefit from having a map that may include one or more distinct regions that may be associated with a photograph and overlayed with a pictorial crop or combination of crops or thumbnails or other subsets of photographic pixels.

In certain embodiments, when the map's zoom level changes, the level of geographic entity changes. As it may not be feasible or at least not desirable in certain embodiments to provide too many blocks in a view of a large city, e.g., due to overcrowding of the map as it appears on a display screen of limited size, in these embodiments, the software system (server+client) is protected from a huge burden of downloading and rendering too many images in real time. Thus, in these embodiments, the right level of geographical entity is displayed for a current zoom level, which advantageously enhances software performance.

In one example process, Open Street Maps (OSM) data may be downloaded for a country. For example, United States OSM data may be downloaded.

Street segments may be generated and stored, particularly for maps of cities or regions within cities. In certain embodiments, street segments inside a park may be ignored. Segments may be composed of two vertices and a street segment having a commonly understood street name.

Park border segments may be generated and stored along with the street segments.

New water-related vertices may be added. In certain embodiments, the following example may be followed to create blocks, polygons or geographic regions within map areas having linear and/or curved segments that border water, such as at beaches, lakes, river banks and dams.

Water polygons or water regions may be converted in certain embodiments into water border line strings.

Street vertices near water objects may be selected if within a determined distance, e.g., 500 meters or less in accordance with certain embodiments.

In certain example embodiments, a point on a water border closest to one or more street vertices may be found. A new "pseudo street" segment may be created from each of these street vertices to that point on the water border. When there are two pseudo street segments that cross one another, an example method may include deleting the one that has a smaller angle with water, where a maximum angle may be 90 degrees. The remaining new points on the water border may form new vertices, such that new segments on the water border are formed. Pseudo street segments may be added to a database containing geographic regions for multiple zoom levels, multiple gps locations, multiple street segments intersecting other streets at vertices defined at both ends, and other map feature data, digital image data, photo overlay or pictorial subset data, associations, metadata, tags and other indicia that relate certain geographic regions or other regions of an map area rendered on a digital display screen controlled by a processor-based device.

In certain embodiments, vertices are created from publicly or privately generated map data that show actual real world borders of roads, water, parks and/or other map features. The basis for these vertices and polygons or other regional shapes is based on real map data that represent real geographic features.

Certain types of street data may be ignored in certain embodiments and/or not used to generate a pattern of vertices nor geographic regions within a map area and/or not stored to the database. One example is a "dead end," while another is a "cul-de-sac", and any other street segment that does not intersect other map features at one or both ends.

Figure 2:
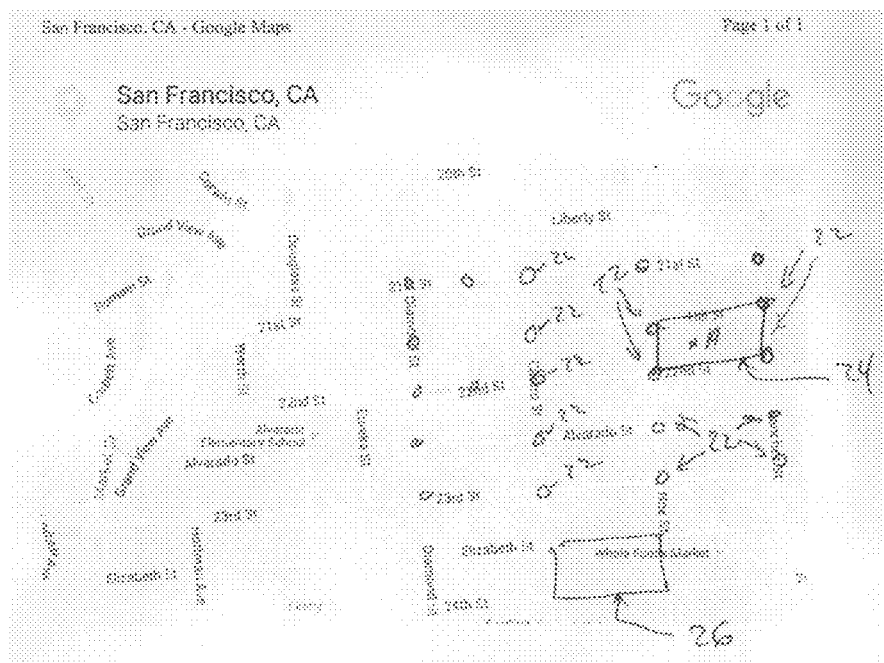
FIG. 2 schematically illustrates some of the vertices of an example block in the example map region illustrated at FIG. 1C.

FIG. 2 schematically illustrates a pattern of vertices of intersecting map features generated based on features appearing within the example geographic map region that is schematically illustrated at FIG. 1A.

Client Request to the Server

A block, neighborhood, or city surrounding a given point "A" may be requested by a client computer, mobile device or other processor-based device. The example point A may be a gps location defined by both a latitude and a longitude, and in certain embodiments height data or distance from the center of the earth or another third dimensional measure of position relative to the Earth. If a block or geographic region within a map area rendered on a display screen that contains this example location or point "A" is already stored in the database, then in certain embodiments the stored region is returned to the client, while in other embodiments, one or more additional regions may be generated that may vary is some large or small way from the stored region or distribution of regions within the map area, such that multiple regional distribution option may be selected from. If there is no geographic region stored in the database for the point A, then the region may be generated dynamically, returned to the client, and stored in the database in certain embodiments.

In either case, once a server in accordance with certain embodiments gets the block polygon or geographic region, the block or region is returned by the server to the client. For example, a JSON formatted stream may be provided as a set of points, in latitude+longitude space (e.g. "37.1121, −122.4532").

Block or Region Generation Examples

For the example point A, a smallest closed polygon of segments that surrounds A may be defined by connecting proximate vertices with continuous lines or curved segments. In one example, vertices within 1 km from A may be used for a particular zoom level setting, while vertices further away are not used. In other words, no vertice further than 1 km from A in this example will be used or considered to generate a block or geographic region or other closed or quasi-closed shape within a map area to be rendered with photo overlays in accordance with certain embodiments. This example rule limits the size of a block in certain embodiments, which may be particularly relevant for rural areas or oceans or polar regions or deserts or other sparse or feature barren regions. In certain embodiments, points in many rural areas may generate no block and have no geographic region to overlay with a pictorial subset or photo overlay.

Figure 3A:
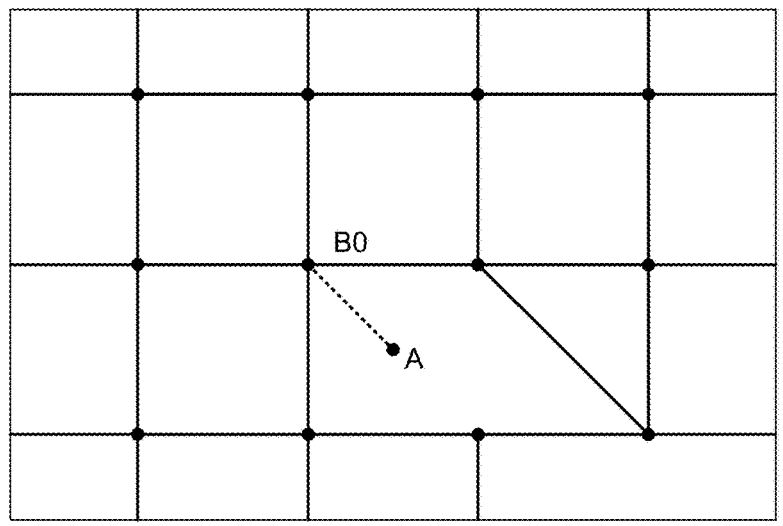
FIGS. 3A-3C schematically illustrate an example method of overlaying a regional shape onto the map that is schematically illustrated at FIG. 1C.

Referring to FIG. 3A, finding a vertice B0 closest to the given point A is illustrated.

Figure 3B:
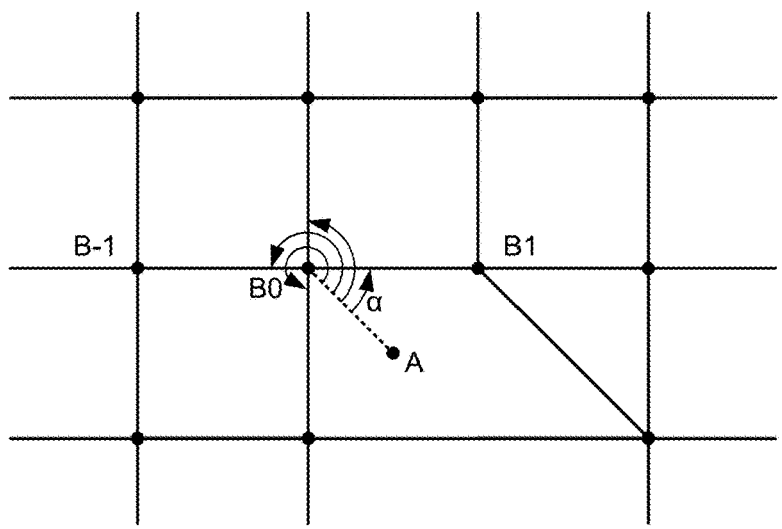

Referring to FIG. 3B, finding a segment B0_B1 with minimal angle A_B0_B1 is illustrated.

Figure 3C:
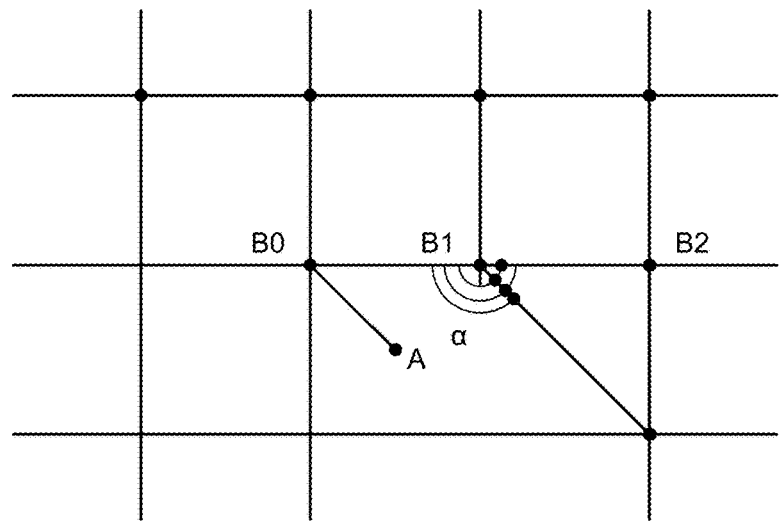

Referring to FIG. 3C, find a segment B1_B2 with minimal angle B0_B1_B2 is illustrated.

Certain embodiments may include one or more iterations (e.g., not more than 100 times) of finding segment $BN\_BN+1$ with minimal angle $BN-1\_BN\_BN+1$ until vertice $BN+1=B0$. If the found polygon is too small, e.g., less than 1000 square meters, then it may be rejected in certain embodiments.

Of course, the amount of detail that is available within a map area represented on a display screen per unit of real area increases with higher zoom but everything outside the area that is rendered on the screen does not appear at all unless the gps location is adjusted or the zoom is reduced. Suffice it to say that certain zoom settings are more useful for certain applications than for others, and a single use of a digitally-rendered map can involve multiple gps location and/or zoom setting adjustments before the user gets a satisfactory answer to a question or a sufficient amount of information.

A map area rendered on a display screen of a digital device may include words, geographic symbols or colors representing landscape features such as mountains and rivers as well as man-made features such as streets, highways, parks, commercial or government buildings, public transit lines and even advertisements. Jurisdictional, legislative or zoning region boundaries may be indicated on a map even if there is no natural nor man-made feature associated with all of part of these boundaries.

In certain embodiments, distinctions and boundaries between a small few to several geographic regions that may be large enough to view on a single display screen may be downloaded from an authoritative or commercial source or from a past experience of the user or a family member, friend or trusted colleague of associate. In certain embodiments, geographic regions can be determined from the map data in accordance with an advantageous process involving collecting certain feature data from the map data appearing on the display screen or user-defined, user-preferred or otherwise subjective inputs from the owner or user of the digital device, or meta-data associated with places or objects on the map that might set geographic regions apart yet might not be viewable, e.g., the price of a home in a certain area or the average rent or the zoning restrictions or demographics of areas.

In certain embodiments, certain common features such as streets, parks, rivers and lakes are selected, particularly common features such as these examples that intersect other common features. Points of intersection of the selected map features, e.g., where perpendicular streets on a city grid meet or where a street meets a river or a park, are collected as a pattern of vertices overlaying the map area. The pattern of vertices may include a reasonable number of vertices spaced apart by between 5 mm and 5 cm depending on the size of the display screen and/or the density or diversity of discernible and relevant differences between subsets of the map area on the display screen.

In certain embodiments, geographic regions can be selectively or arbitrarily generated by providing continuous linear or curved segments between adjacent or closest vertices and/or connecting vertices in a manner designed to generate the largest number of closed shapes or more or less some reasonable number such as 5, 10 or 15 regions in the displayed map area, or selecting smallest sized, closed polygons or curved or arbitrarily shaped geographic regions formed by including the fewest number of vertices without skipping or a fewest number of smallest segments between vertices or picking a rotation direction always turning 90 degrees in a same direction toward a closest next vertice, or another set of rules such as these that produces reliably a satisfactory number of not too many and not too few closed shapes on the display screen. These one or more regional shapes are generated in certain embodiments such as to respectively enclose one or more geographic regions on the display screen based on the pattern of vertices.

In certain embodiments, trusted social network friends or any designated group of people may use subjective preferences or favorites, perceived objective knowledge, or commercial data such as may have been purchased by a person or company with a business agenda to draw up the geographic region distribution of a map area, or rules or process steps to be followed, in certain embodiment, for collecting feature data, or feature intersection data, to generate the pattern of vertices from which the regions are drawn by connecting the dots, or to directly or by freehand (without the dots) draw shapes that follow common sense boundaries or preferentially selected boundaries or boundary segments based on map feature data, meta data or user experiences where pictures may have been taken including the user and certain friends in a group picture or the user alone in a selfie or an object or music group or idea that in certain embodiments a user may wish to associate with a certain geographic region by attaching a tag to the image data identifying the geographic region or by tagging the region with identifying digital image indicia. A collection of vertices, or dots, in accordance with certain embodiments, provides a framework for generating closed shapes such as polygons, or ellipses or other curved shapes that photo overlay images may be placed on top of within the map. Such association of a geographic region with a digital image may be used during the process of generating the geographic regions or selecting region shapes and/or sizes and/or such association may occur after the geographic regions are determined or otherwise may be independent of the process that resulted in creation of the pattern of vertices and/or geographic regional shapes within the map area.

Regardless, a digital image may be associated with a geographic region within a map area on a digital device screen display by the owner of the device or a designated proxy such as a favorite social network page or other web site designated by the owner of the device or a proxy. In certain embodiments, one or more pictorial subsets of the associated digital image data are generated that have a same or similar shape as the geographic region and/or may have a same or similar size, and/or resolution, and/or the pictorial subset may be cropped and/or rotated and cropped and/or zoomed in or out before rotating and/or cropping to match the shape of the geographic region so that the map area may be rendered on the display screen with the pictorial subset overlayed onto the associated geographic region without overlaying adjacent or proximate geographic regions which may be overlayed themselves with an associated pictorial subset.

The pictorial subsets or photo overlays may be created by cutting the geographic entity's shape out of a rectangular base photo like using a cookie cutter. In certain embodiments, neither adjacent geographic regions nor adjacent photo overlays overlap, while either or both may share all or a fraction of a common border and/or separations may appear between photo overlayed geographic regions such as streets or other features that serve to space apart features or entities that may appear on a map area. Lines may be drawn along a common boundary to delineate different photo overlay images and/or different geographic regions or other area subsets that may appear on a map and little or no spacing is desired to be disposed between adjacent examples of such different photo overlays and/or map regions.

Photo overlay images may be displayed collectively as a layer in a digital map. Photo overlay images may pan and zoom with the map, along with other map annotations like street names and geographic border designations. In certain embodiments, the photo overlay images become part of the map interface that changes as the rest of the map changes.

Certain digital images may be selected over others based on a wide variety of factors such as locations, e.g., latitude and longitude coordinates, associated with the digital images. That location may be where the photo was taken, or it may be some other attribute of the image (e.g. the home of the photographer). Other factors may include most likes, most views, most comments, most recent photo submitted, most recent photo taken. Multiple photos may rotate like a slide show within the geographic region or may be combined such as in a collage, or a video clip may automatically play or by available to play as a sequence of pictorial subsets of video frames within the geographic region. One or more photos may be taken by one person or a group of people, such as people the user follows, friends of the user, a private group such as coworkers or classmates or club members or a demographic group, an age group such as teens or senior citizens, or a gender or a political campaign or social reform group or consumer advocate group.

Any digital image can be deselected or selected based on how old the photo is, or based on the photo being taken or submitted in a specific time or date period or range around a certain time or date within which the photo was not taken or submitted, such as the current year or the user birth year or the birth year of a child or other family member of the user or a current month or birth month of the user or someone close to the user, or the current week or another selected week in history, or today or any day in the past when a photo may have been taken or submitted, and an arbitrary time or date range may be selected from X time/date to Y time/date.

In certain embodiments, a map area may be displayed on a screen of a digital device or controlled by a processor directly or remotely or over a network. The map area may include photo overlays whose bounds may include one or more borders of geographic regions or entities within the map area on the display screen. In one view, multiple geographic entities may be at the same level (e.g. blocks, neighborhoods, cities, counties, states, countries).

Each of the photos that appear on the map area may be referred to as photo overlays or pixel subsets of larger images or pictorial subsets or image overlays. An overlay may be created in one example embodiment by cutting the geographic entity's shape out of a rectangular base photo, like using a cookie cutter, and any of a variety of cropping methods may be used and/or image data may be shrunk in size proportional to a reduction in zoom, or vice versa, or proportional to an initial disparity between the size of an associated digital image and a geographical region within a map area displayed on a digital device screen or on a display device that is controlled by a processor-based device.

Figure 4A:
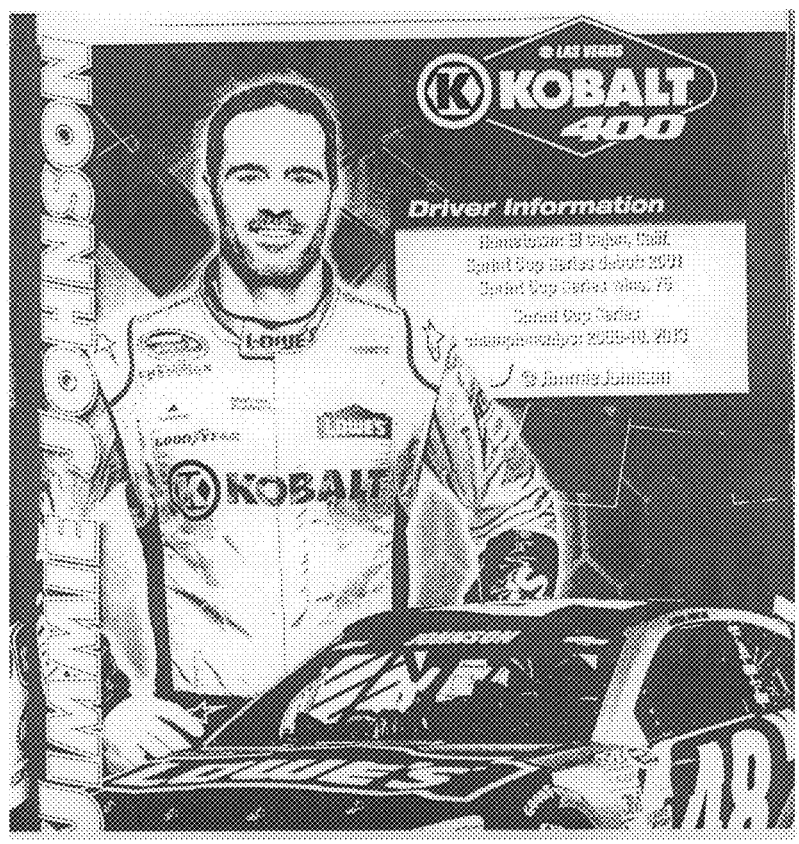
FIGS. 4A-4C schematically illustrate how to overlay a pictorial subset of a selected digital image on top of a regional shape based on features appearing within a map region in accordance with certain embodiments.
Figure 4B:
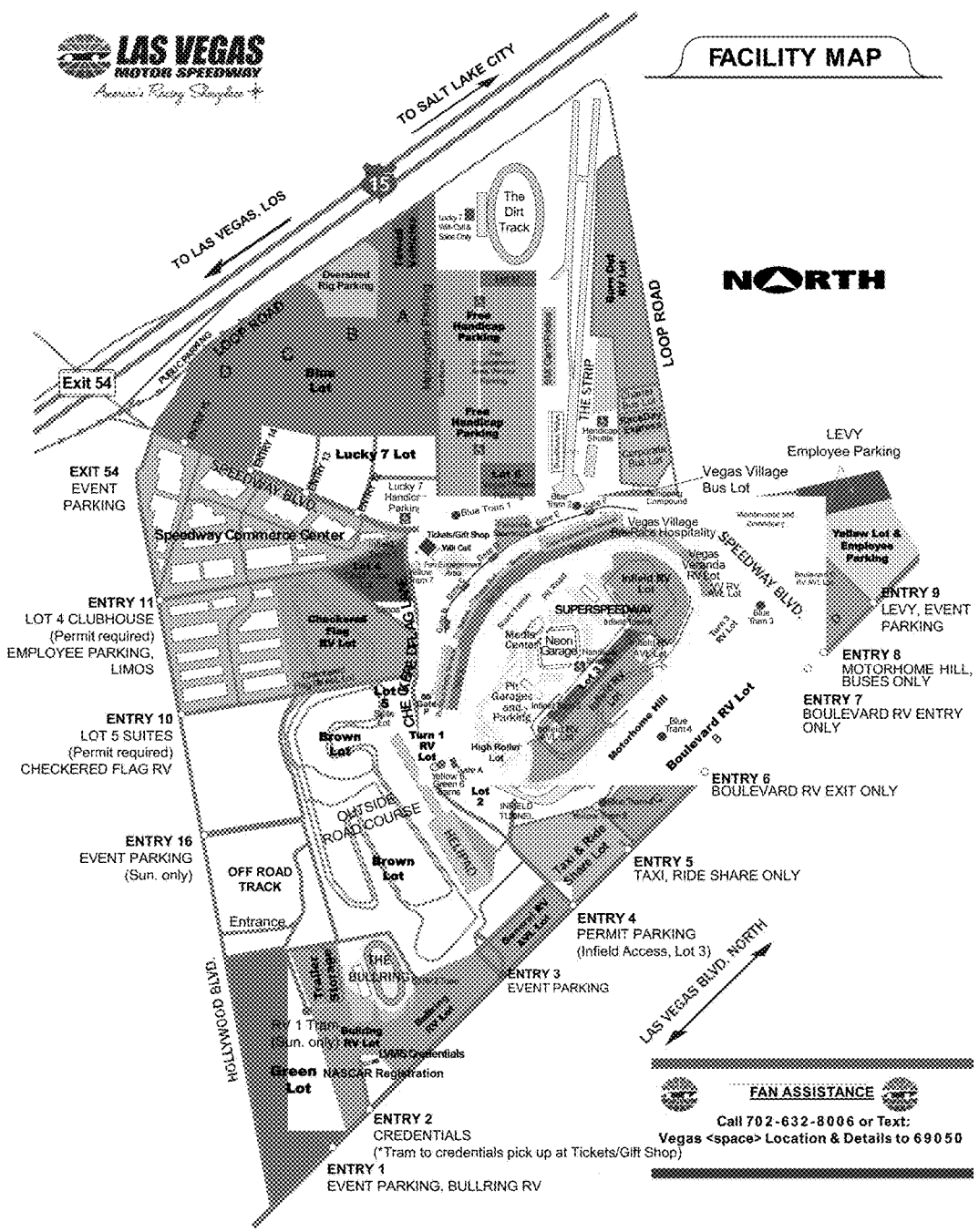
Figure 4C:
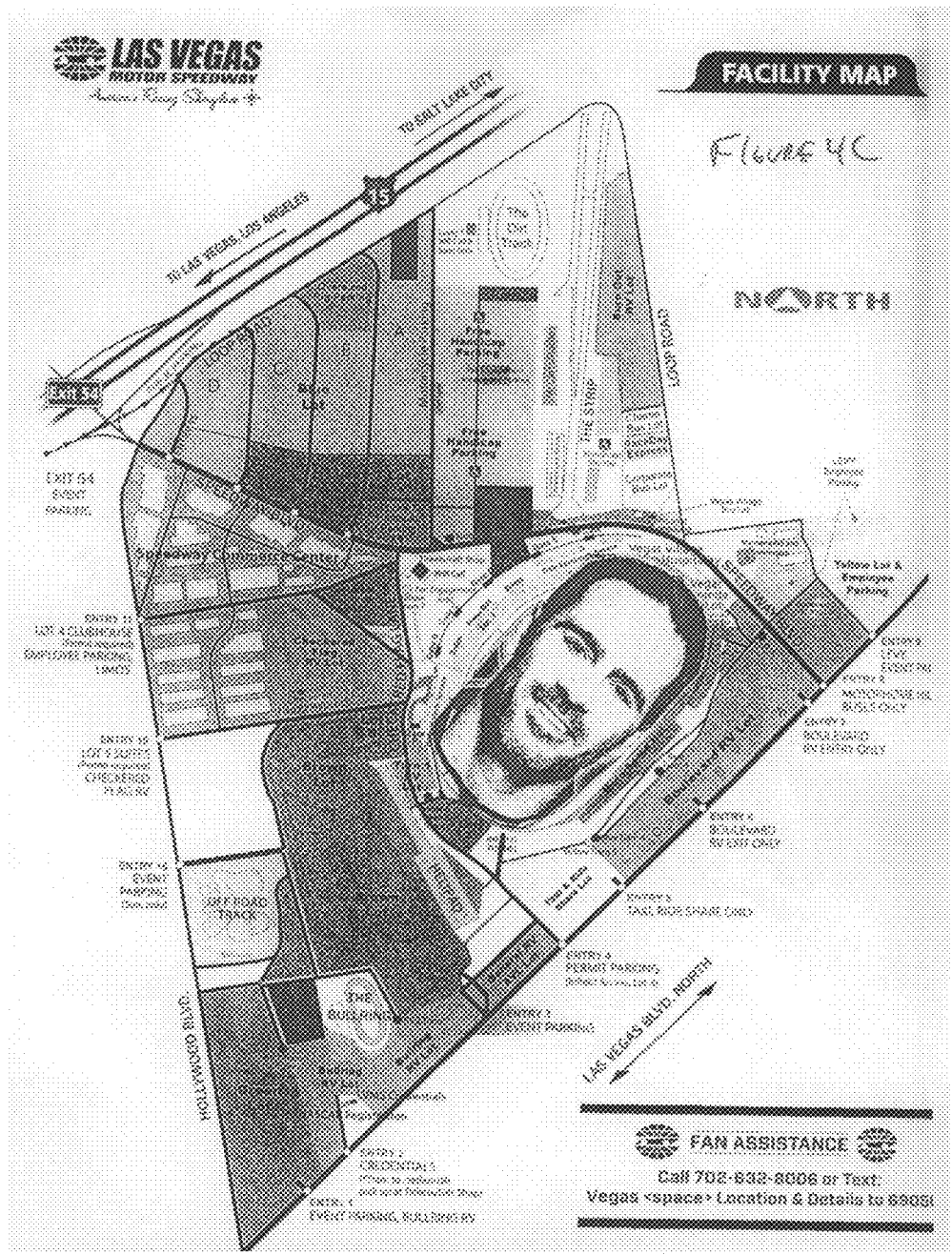

FIGS. 4A-4B schematically illustrate generating a pictorial subset of a selected digital image that matches a regional shape generated based on features appearing within a map region such as the example map region illustrated schematically in FIGS. 1A-3C in accordance with certain embodiments.

Figure 1B:
Figure 1C:
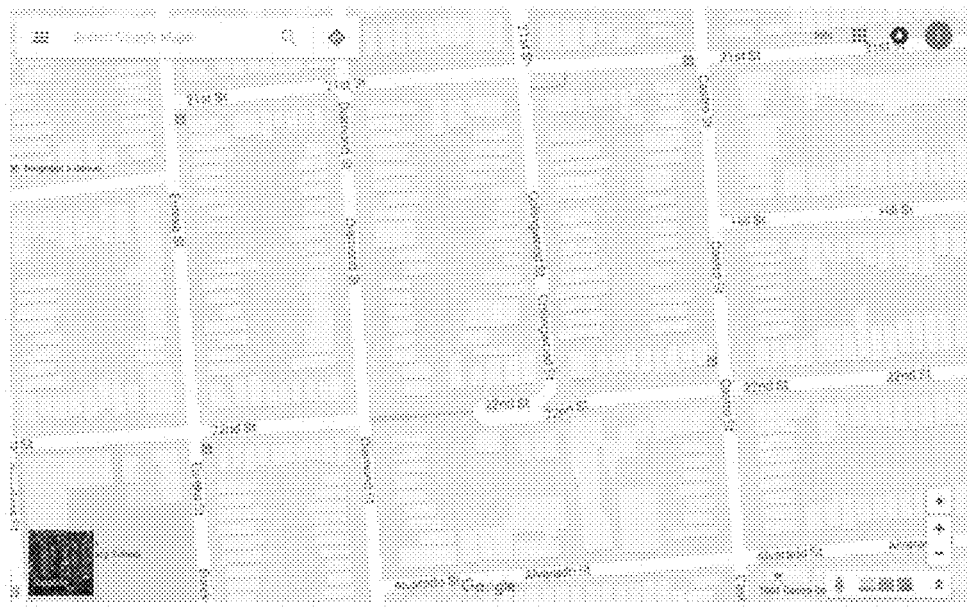
Figure 5A:
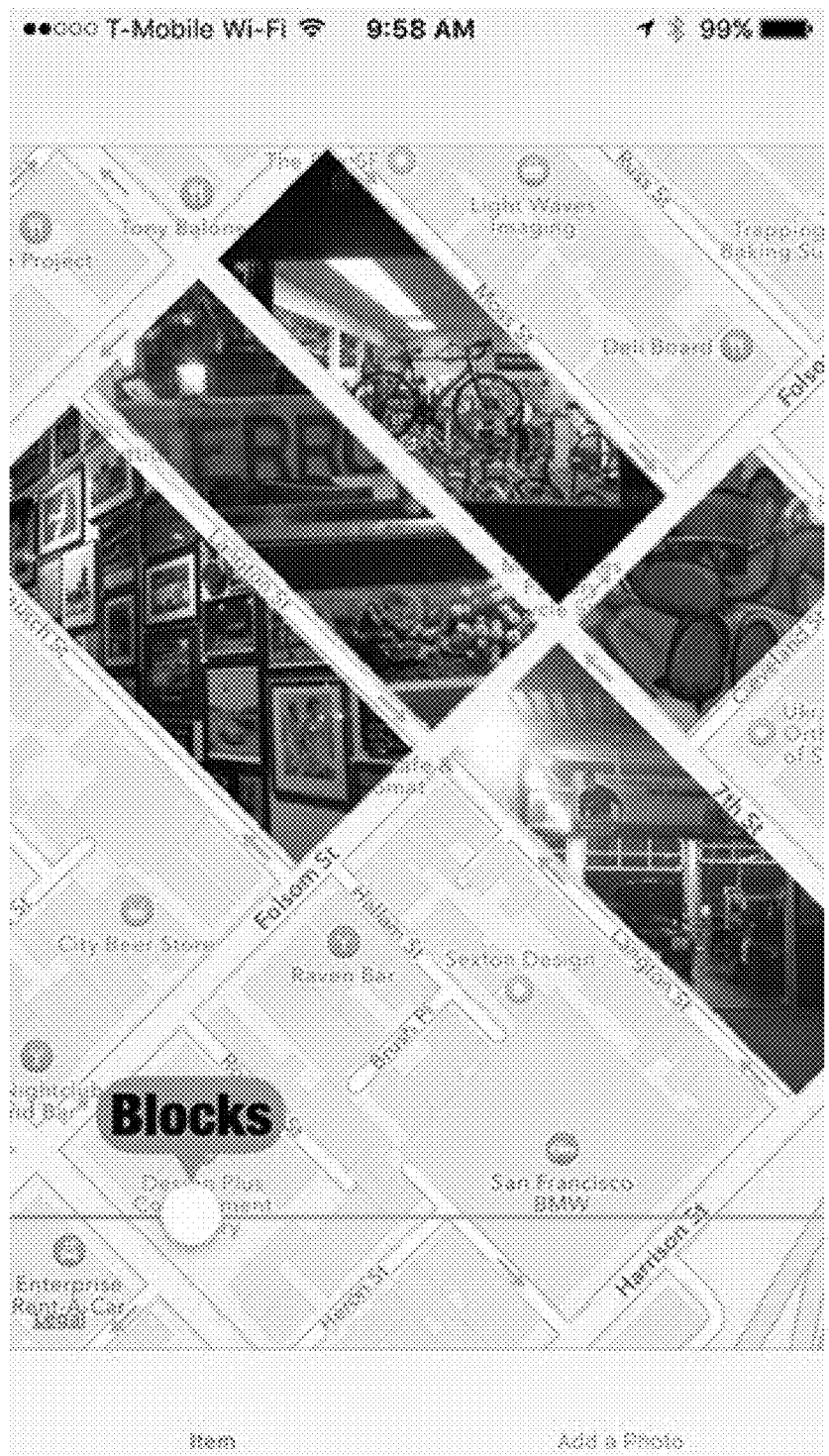
FIGS. 5A-5C schematically illustrate overlaying one or more pictorial subsets, such as in the example of FIGS. 4A-4C, onto regional shapes, such as in the example of FIGS. 1A-1C, in accordance with certain embodiments.
Figure 5B:
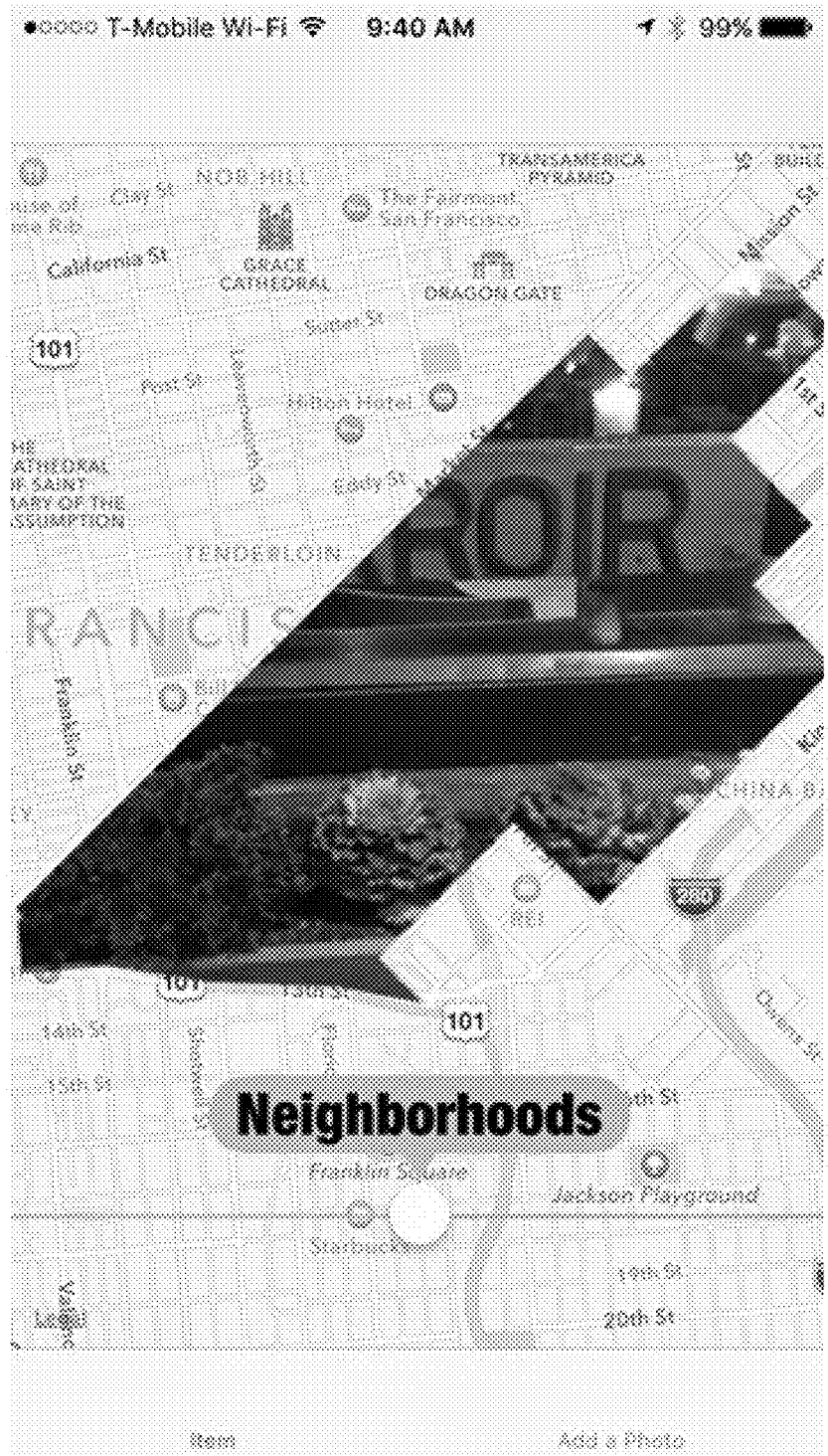
Figure 5C:
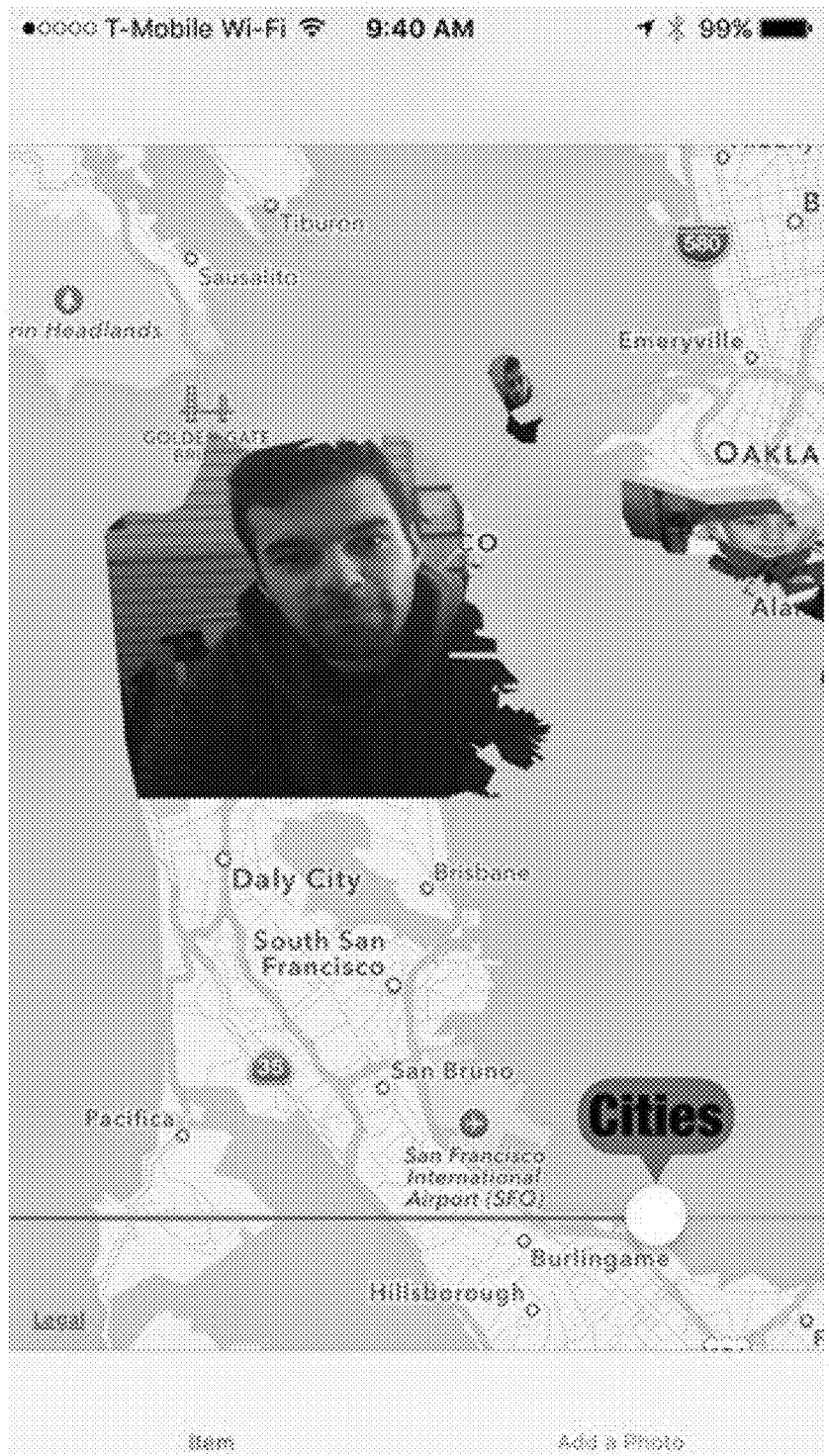

Referring to FIGS. 5A-5C, three views at three zoom levels are illustrated for a starting point or location in the South of Market neighborhood of San Francisco. FIGS. 1A-1C respectively illustrate a Block view, a Neighborhood view, and a City view in accordance with certain embodiments.

Data generated for geographic regions in accordance with certain embodiments may be used to render a map or for other purposes. For example, data generated for geographic regions in accordance with certain embodiments may be used to aggregate point historical data per geographic region. Those aggregate data could then be presented in a map and/or in another way other than in a map, such as (i) a graph (e.g., a pie chart of all robberies in a neighborhood by block), or (ii) a table (e.g., a table showing number of robberies in a neighborhood by block), or (iii) a summary of statistics (e.g., 7% of robberies in the neighborhood last year were in block A, 4% were in block B, etc.), or (iv) a regression analysis (e.g., robberies in a block are highly correlated with evictions in a block).

Data generated and/or created for geographic regions in accordance with certain embodiments may be used to generate alerts of one or more occurrences of a type of event in real time. Categorization inside a geographic entity in accordance with certain embodiments may be used to assist and/or enable users (e.g., city police or fire authorities, neighborhood watch or other community groups) to decide how to respond. For example, a fire may be reported as having broken out in a particular block. The proper block designation would trigger an alarm at the correct fire station in certain embodiments. In another example, a power outage may occur at a particular electric company region that is defined within an infrastructure map in accordance with certain embodiments. The region data may be used to assist or enable a power company to diagnose where the source of the problem is and/or how to respond. In another example, security cameras may detect a number of usual or unusual motion patterns or alerts in a geographic region such as in a neighborhood defined as a few blocks within a city and within a within a certain time range. This could help users understand the activities happening in this neighborhood for developing marketing or police strategies.

A map may be generated with defined geographic regions at multiple zoom levels in accordance with certain embodiments. Such a map may be displayed on a display screen of a digital device or in other ways including as a 3D model or a paper print out.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Thus, for example, it will be appreciated by those of ordinary skill in the art that the diagrams, schematics, illustrations, and the such as represent conceptual views or processes illustrating systems and methods in accordance with particular embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

What is claimed is:

1. A method of generating digital representations of geographic regional shapes for creating informational overlays from associated data that match the geographic regional shapes to render on a map on a display screen, comprising:

selecting an area of a map that includes one or more geographic regions for rendering by a processor on a display screen;

downloading map data corresponding to map features appearing within said area of said map;

collecting from said map data a pattern of vertices of intersecting map features including streets, parks and water boundaries;

generating one or more data sets corresponding to the one or more regional shapes that respectively enclose the one or more geographic regions on the display screen based on the pattern of vertices, including for each region:

finding a first vertice $B_0$, which is closest to a point location A within said region;

finding a first segment $B_0\_B_1$ which connects said first vertice $B_0$ to a second vertice $B_1$ with a first continuous line;

finding a second segment $B_1\_B_2$ which connects said second vertice $B_1$ to a third vertice $B_2$ with a second continuous line; and iterating finding segments $B_N\_B_{N+1}$ until vertice $B_{N+1}=B_0$; and combining said segments $B_0\_B_1, B_1\_B_2, \ldots, B_N\_B_0$ to form a smallest closed polygon around point location A defined by vertices $B_0, B_1, \ldots B_N$ each selected from said pattern of vertices; and transmitting the one or more data sets corresponding to the one or more regional shapes to a processor based device programmed to present information associated with the one or more geographic regions to a user by rendering said map area on a display screen with said presented information overlayed within said one or more geographic regions.

2. The method of claim 1, rendering said area of said map on said display screen including one or more overlayed presentations of subsets of said information.

3. The method of claim 1, wherein said intersecting map features comprise boundaries of real areas represented by said one or more geographic regions configured for rendering on said display screen.

4. The method of claim 1, wherein said intersecting map features further comprise neighborhoods, or legislative or jurisdictional borders, or combinations thereof.

5. The method of claim 1, wherein said information is retrieved and shaped by said processor to match said one or more geographic regions.

6. The method of claim 1, wherein said information comprises one or more pictorial subsets of photographs that are respectively associated with and sized and shaped to match said one or more geographic regions.

7. The method of claim 1, comprising selecting said area of said map based on point location and zoom inputs.

8. The method of claim 7, comprising updating said one or more geographic regions and regional shapes based on received point location updates.

9. The method of claim 7, comprising updating said one or more geographic regions and regional shapes based on received zoom level changes.

10. The method of claim 1, comprising generating a number of said regional shapes within said area on said map for overlaying with said presented information.

11. The method of claim 1, wherein said intersecting map features each comprise one or more segments that intersect other intersecting map features at each end defining two of said vertices.

12. The method of claim 1, wherein said one or more regional shapes comprise one or more curved shapes.

13. The method of claim 1, comprising receiving one or more sets of image data respectively associated with said one or more geographic regions; and
generating one or more selected pictorial subsets from said sets of image data to respectively match said one or more regional shapes for rendering one or more pictorially overlayed geographic regions on said map on said display screen.

14. The method of claim 1, wherein said segments B0_B1, B1_B2, ..., BN_B0 comprise map feature segments.

15. The method of claim 1, wherein an Nth continuous line segment BN_BN+1 matches a shape of an Nth map feature segment, wherein said Nth vertice BN comprises an intersection of the Nth−1 and Nth map feature segments.

16. A processor-based device, comprising:
a processor;
a port for sending and receiving data over a network; and
one or more digital storage devices having embedded therein code for programming the processor to perform a method of generating or receiving geographic regional shapes for creating matching informational overlays from associated data to render on a map on a display screen, wherein the method comprises:

selecting an area of a map that includes one or more geographic regions for rendering by a processor on a display screen;

downloading map data corresponding to map features appearing within said area of said map;

collecting from said map data a pattern of vertices of intersecting map features including streets, parks and water boundaries;

generating one or more data sets corresponding to the one or more regional shapes that respectively enclose the one or more geographic regions on the display screen based on the pattern of vertices, including for each region:
finding a first vertice $B_0$, which is closest to a point location A within said region;
finding a first segment $B_0\_B_1$ which connects said first vertice $B_0$ to a second vertice $B_1$ with a first continuous line;
finding a second segment $B_1\_B_2$ which connects said second vertice $B_1$ to a third vertice $B_2$ with a second continuous line; and
iterating finding segments $B_N\_B_{N+1}$ until vertice $B_{N+1}=B_0$; and
combining said segments $B_0\_B_1, B_1\_B_2, \ldots, B_N\_B_0$ to form a smallest closed polygon around point location A defined by vertices $B_0, B_1, \ldots B_N$ each selected from said pattern of vertices; and transmitting the one or more data sets corresponding to the one or more regional shapes to a processor based device programmed to present information associated with the one or more geographic regions to a user by rendering said map area on a display screen with said presented information overlayed within said one or more geographic regions.

17. The processor-based device of claim 16, wherein the method comprises rendering said area of said map on said display screen including one or more overlayed presentations of subsets of said information.

18. The processor-based device of claim 16, wherein said intersecting map features comprise boundaries of real areas represented by said one or more geographic regions configured for rendering on said display screen.

19. The processor-based device of claim 16, wherein said intersecting map features further comprise neighborhoods, or legislative or jurisdictional borders, or combinations thereof.

20. The processor-based device of claim 16, wherein the method comprises retrieving and shaping said presented information to match said one or more geographic regions.

21. The processor-based device of claim 16, wherein said information comprises one or more pictorial subsets of photographs that are respectively associated with and sized and shaped to match said one or more geographic regions.

22. The processor-based device of claim 16, wherein the method comprises selecting said area of said map based on point location and zoom inputs.

23. The processor-based device of claim 22, wherein the method comprises updating said one or more geographic regions and regional shapes based on received point location updates.

24. The processor-based device of claim 22, wherein the method comprises updating said one or more geographic regions and regional shapes based on received zoom level changes.

25. The processor-based device of claim 16, wherein the method comprises generating a predetermined number of said regional shapes within said area on said map for overlaying with said presented information.

26. The processor-based device of claim 16, wherein said intersecting map features each comprise one or more segments that intersect other intersecting map features at each end defining two of said vertices.

27. The processor-based device of claim 16, wherein said one or more regional shapes comprise one or more curved shapes.

28. The processor-based device of claim 16, wherein the method comprises:
receiving one or more sets of image data respectively associated with said one or more geographic regions; and
generating one or more of said selected pictorial subsets from said sets of image data to respectively match said one or more regional shapes for rendering one or more pictorially overlayed geographic regions on said map on said display screen.

29. The processor-based device of claim 16, wherein said segments B0_B1, B1_B2, . . . , BN_B0 comprise map feature segments.

30. The processor-based device of claim 16, wherein an Nth continuous line segment BN_BN+1 matches a shape of an Nth map feature segment, wherein said Nth vertice BN comprises an intersection of the Nth−1 and Nth map feature segments.

31. One or more processor-readable digital storage devices having embedded therein code for programming a processor to perform a method of generating geographic regional shapes for creating matching informational overlays from associated data to render on a map on a display screen, wherein the method comprises:
selecting an area of a map that includes one or more geographic regions for rendering by a processor on a display screen;
downloading map data corresponding to map features appearing within said area of said map;
collecting from said map data a pattern of vertices of intersecting map features, including streets, parks and water boundaries;
generating one or more data sets corresponding to the one or more regional shapes that respectively enclose the one or more geographic regions on the display screen based on the pattern of vertices, including for each region:
finding a first vertice $B_0$, which is closest to a point location A within said region;
finding a first segment $B_0\_B_1$ which connects said first vertice $B_0$ to a second vertice $B_1$ with a first continuous line;
finding a second segment $B_1\_B_2$ which connects said second vertice $B_1$ to a third vertice $B_2$ with a second continuous line; and
iterating finding segments $B_N\_B_{N+1}$ until vertice $B_{N+1}=B_0$; and
combining said segments $B_0\_B_1, B_1\_B_2, \ldots, B_N\_B_0$ to form a smallest closed polygon around point location A defined by vertices $B_0, B_1, \ldots B_N$ each selected from said pattern of vertices; and
transmitting the one or more data sets corresponding to the one or more regional shapes to a processor based device programmed to present information associated with the one or more geographic regions to a user by rendering said map area on a display screen with said presented information overlayed within said one or more geographic regions.

32. The one or more processor-readable digital storage devices of claim 31, wherein the method comprises rendering said area of said map on said display screen including one or more overlayed presentations of subsets of said information.

33. The one or more processor-readable digital storage devices of claim 31, wherein said intersecting map features comprise boundaries of real areas represented by said one or more geographic regions configured for rendering on said display screen.

34. The one or more processor-readable digital storage devices of claim 31, wherein said intersecting map features further comprise neighborhoods, or legislative or jurisdictional borders, or combinations thereof.

35. The one or more processor-readable digital storage devices of claim 31, wherein the method comprises retrieving and shaping said presented information to match said one or more geographic regions.

36. The one or more processor-readable digital storage devices of claim 31, wherein said information comprises one or more pictorial subsets of photographs that are respectively associated with and sized and shaped to match said one or more geographic regions.

37. The one or more processor-readable digital storage devices of claim 31, wherein the method comprises selecting said area of said map based on point location and zoom inputs.

38. The one or more processor-readable digital storage devices of claim 37, wherein the method comprises updating said one or more geographic regions and regional shapes based on received point location updates.

39. The one or more processor-readable digital storage devices of claim 37, wherein the method comprises updating said one or more geographic regions and regional shapes based on received zoom level changes.

40. The one or more processor-readable digital storage devices of claim 31, wherein the method comprises generating a predetermined number of said regional shapes within said area on said map for overlaying with said presented information.

41. The one or more processor-readable digital storage devices of claim 31, wherein said intersecting map features each comprise one or more segments that intersect other intersecting map features at each end defining two of said vertices.

42. The one or more processor-readable digital storage devices of claim 31, wherein said one or more regional shapes comprise one or more curved shapes.

43. The one or more processor-readable digital storage devices of claim 31, wherein the method comprises:
receiving one or more sets of image data respectively associated with said one or more geographic regions; and
generating one or more of said selected pictorial subsets from said sets of image data to respectively match said one or more regional shapes for rendering one or more pictorially overlayed geographic regions on said map on said display screen.

44. The one or more processor-readable digital storage devices of claim 31, wherein said segments B0_B1, B1_B2, . . . , BN_B0 comprise map feature segments.

45. The one or more processor-readable digital storage devices of claim 31, wherein an Nth continuous line segment BN_BN+1 matches a shape of an Nth map feature segment, wherein said Nth vertice BN comprises an intersection of the Nth−1 and Nth map feature segments.

* * * * *